(12) United States Patent
Lee et al.

(10) Patent No.: US 11,082,889 B2
(45) Date of Patent: Aug. 3, 2021

(54) METHOD AND DEVICE FOR RECEIVING DATA UNIT

(71) Applicant: LG Electronics Inc., Seoul (KR)

(72) Inventors: Gyeongcheol Lee, Seoul (KR); Seungjune Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/608,580

(22) PCT Filed: Apr. 25, 2018

(86) PCT No.: PCT/KR2018/004790
§ 371 (c)(1),
(2) Date: Oct. 25, 2019

(87) PCT Pub. No.: WO2018/199622
PCT Pub. Date: Nov. 1, 2018

(65) Prior Publication Data
US 2020/0059823 A1 Feb. 20, 2020

Related U.S. Application Data

(60) Provisional application No. 62/489,994, filed on Apr. 25, 2017.

(51) Int. Cl.
*H04W 28/06* (2009.01)
*H04W 76/15* (2018.01)
*H04W 76/27* (2018.01)
*H04L 12/801* (2013.01)
*H04W 80/02* (2009.01)

(52) U.S. Cl.
CPC ........... *H04W 28/065* (2013.01); *H04L 47/34* (2013.01); *H04W 76/15* (2018.02); *H04W 76/27* (2018.02); *H04W 80/02* (2013.01)

(58) Field of Classification Search
None
See application file for complete search history.

(56) References Cited

U.S. PATENT DOCUMENTS

| 8,169,905 | B2 | 5/2012 | Umesh et al. |
| 9,559,930 | B2 | 1/2017 | Yi et al. |
| 2005/0270996 | A1* | 12/2005 | Yi .......................... H04L 1/1841 370/312 |
| 2008/0025314 | A1* | 1/2008 | Lee .......................... H04L 47/34 370/394 |

(Continued)

FOREIGN PATENT DOCUMENTS

KR 100913900 8/2009

OTHER PUBLICATIONS

PCT International Search Report and Written Opinion in International Application No. PCT/KR2018/004790, dated Aug. 27, 2018, 13 pages.

*Primary Examiner* — Anh Vu H Ly
(74) *Attorney, Agent, or Firm* — Fish & Richardson P.C.

(57) ABSTRACT

In the present invention, a radio link control (RLC) entity of the receiving device receives an RLC service data unit (SDU) segment of a first RLC SDU. The RLC entity starts a first reassembly timer for the first RLC SDU if the RLC SDU segment of the first RLC SDU is the first one received for the first RLC SDU at the RLC entity. The receiving device uses a reassembly timer per RLC SDU segmented.

10 Claims, 8 Drawing Sheets

(56) References Cited

U.S. PATENT DOCUMENTS

| | | | |
|---|---|---|---|
| 2009/0046626 A1* | 2/2009 | Shao | H04L 47/10 |
| | | | 370/320 |
| 2010/0118780 A1* | 5/2010 | Umesh | H04L 1/1841 |
| | | | 370/328 |
| 2011/0170548 A1* | 7/2011 | Kang | H04L 1/1841 |
| | | | 370/394 |
| 2012/0155438 A1 | 6/2012 | Shin et al. | |
| 2014/0233490 A1 | 8/2014 | Yi et al. | |
| 2016/0352467 A1* | 12/2016 | Rawat | H04L 1/1848 |
| 2017/0041767 A1* | 2/2017 | Vajapeyam | H04W 28/0205 |
| 2017/0048922 A1* | 2/2017 | Lee | H04W 76/11 |
| 2017/0310421 A1* | 10/2017 | Froberg Olsson | H04L 1/1874 |
| 2018/0124767 A1* | 5/2018 | Shaheen | H04W 72/0406 |
| 2018/0124843 A1* | 5/2018 | Shaheen | H04W 80/02 |
| 2018/0181207 A1* | 6/2018 | Fullam | G06F 3/002 |
| 2019/0124548 A1* | 4/2019 | Liu | H04L 47/34 |
| 2019/0394832 A1* | 12/2019 | Jiang | H04W 28/06 |
| 2020/0053326 A1* | 2/2020 | Diep | H04W 4/80 |
| 2020/0068581 A1* | 2/2020 | Xu | H04L 1/1841 |
| 2020/0205224 A1* | 6/2020 | Lee | H04W 28/065 |
| 2020/0274651 A1* | 8/2020 | Yi | H04W 12/007 |

* cited by examiner

[Fig. 1]
E-UMTS
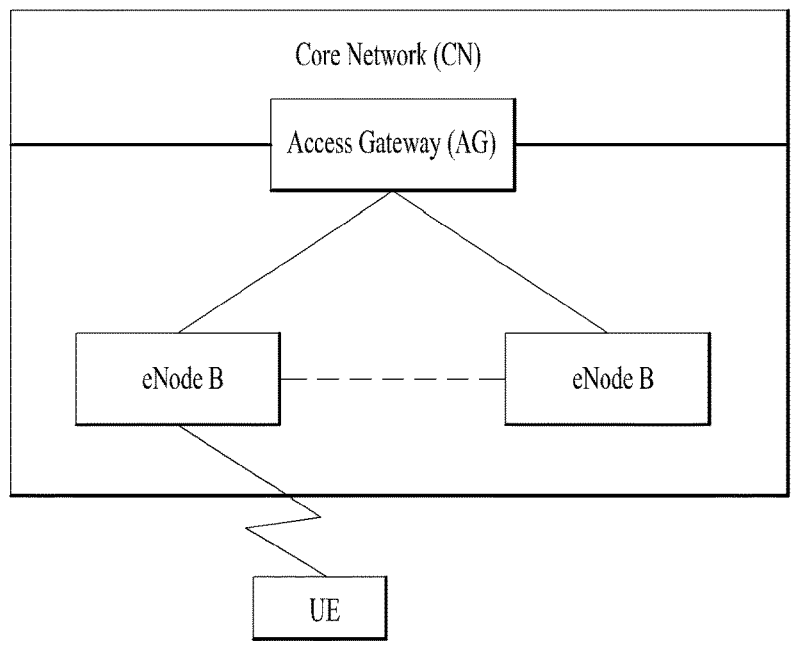
[Fig. 2]
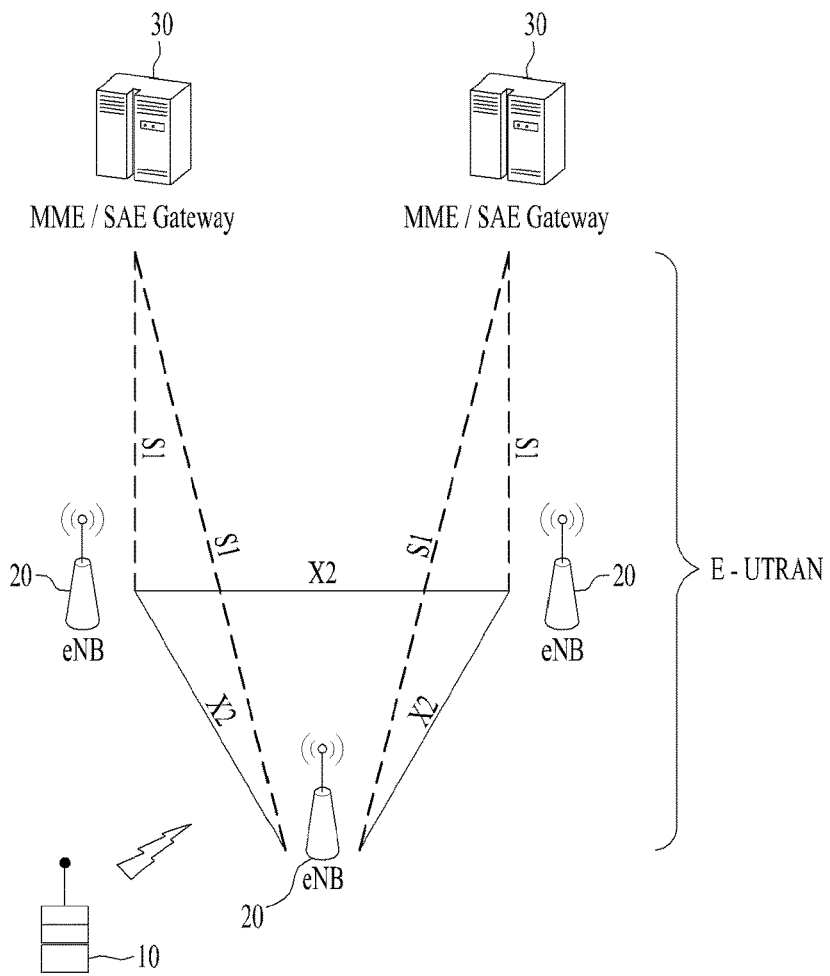

[Fig. 3]
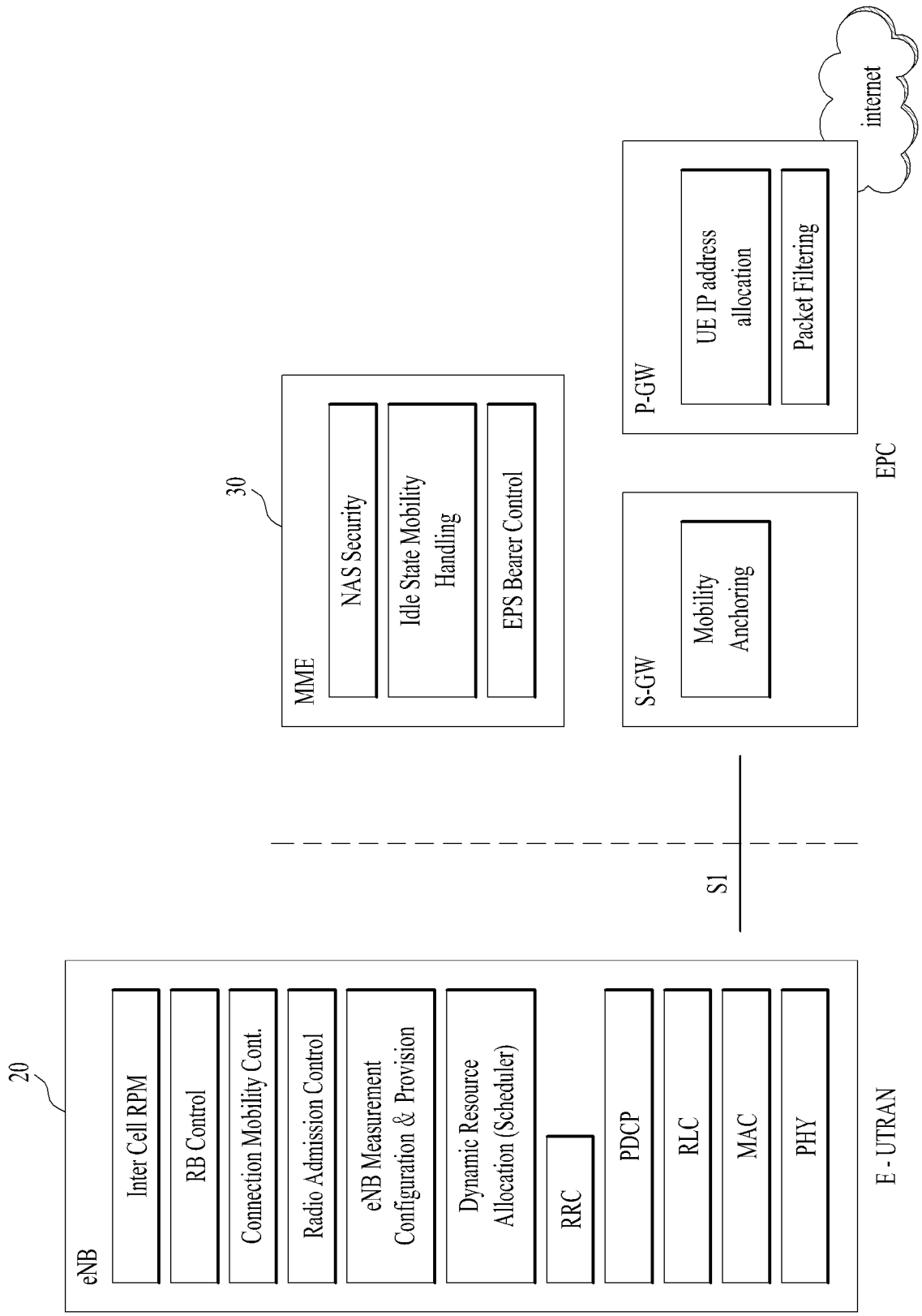

[Fig. 4]
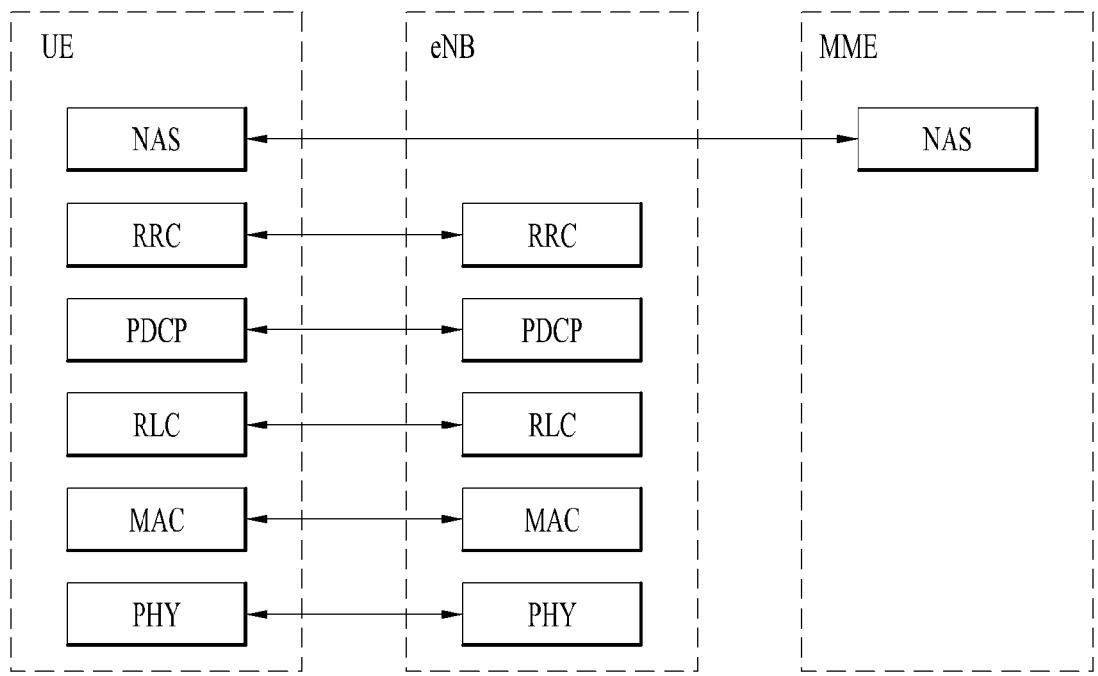
(a) Control-Plane Protocol Stack
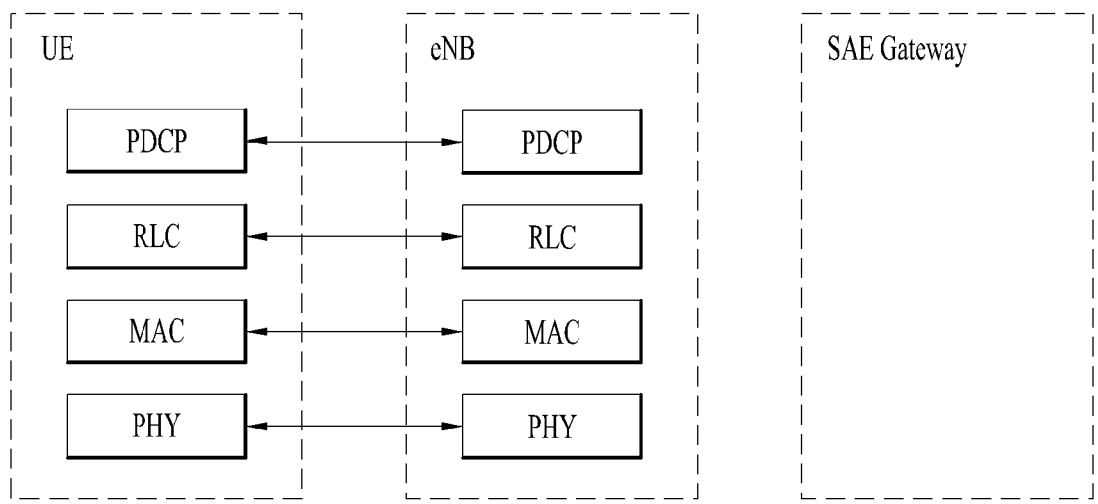
(b) User-Plane Protocol Stack

[Fig. 5]
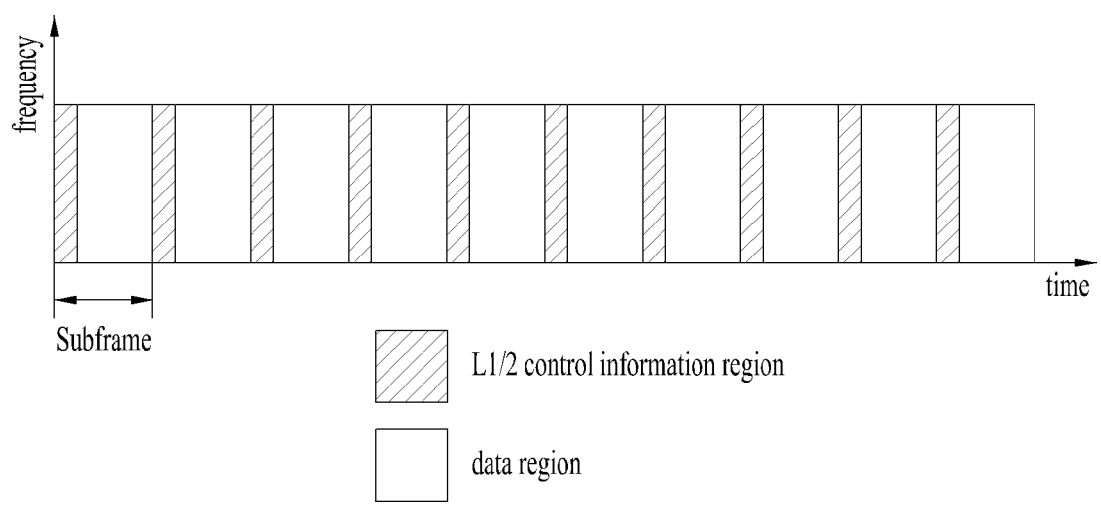

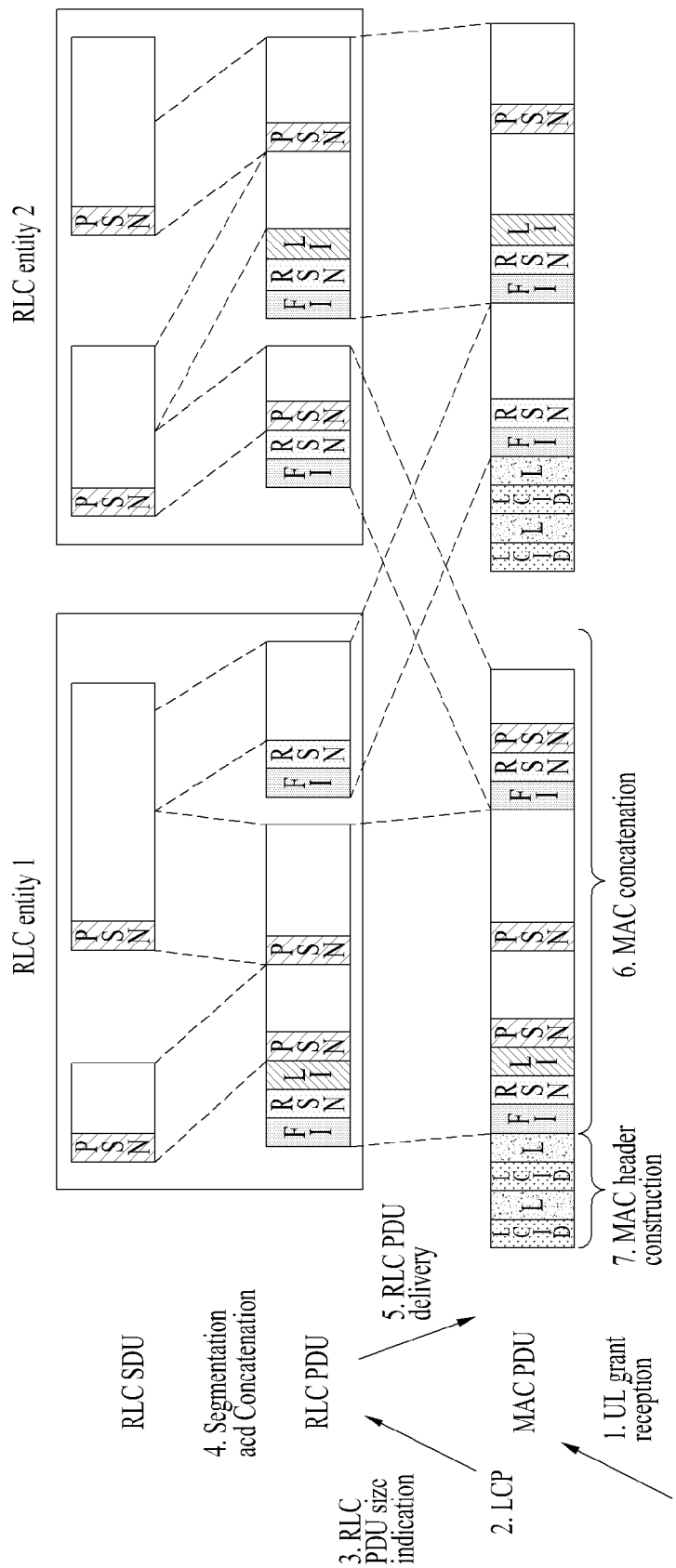
[Fig. 6]

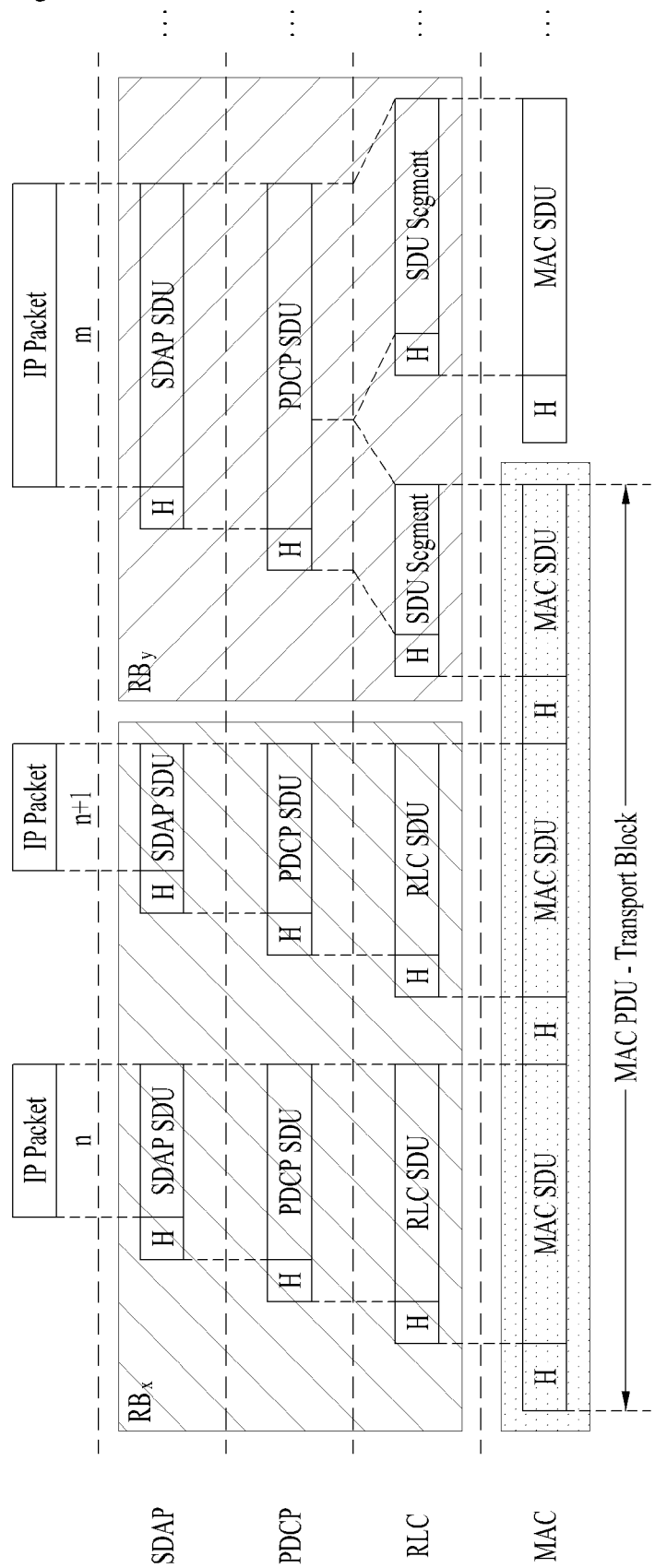
[Fig. 7]

[Fig. 8]
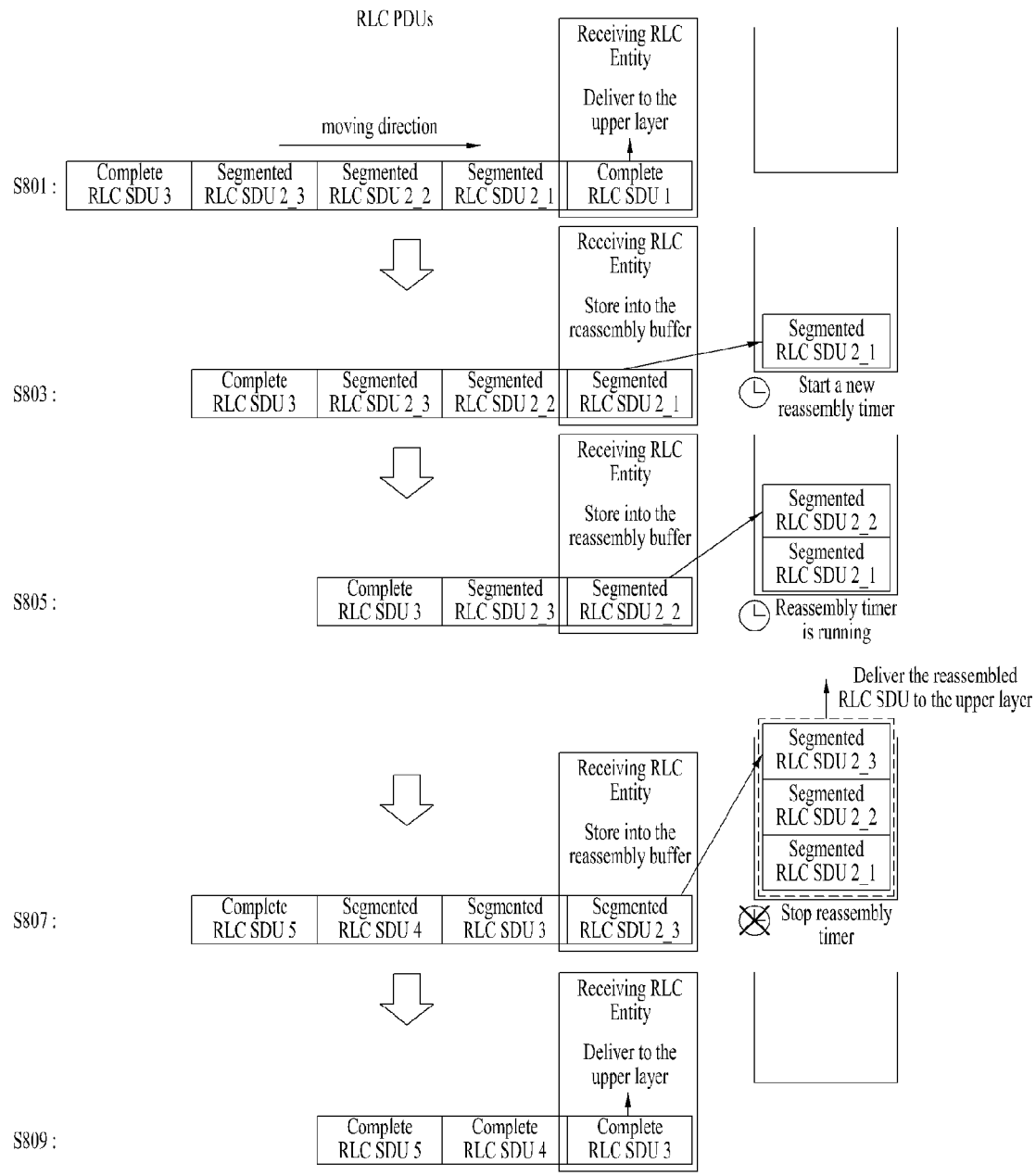

[Fig. 9]
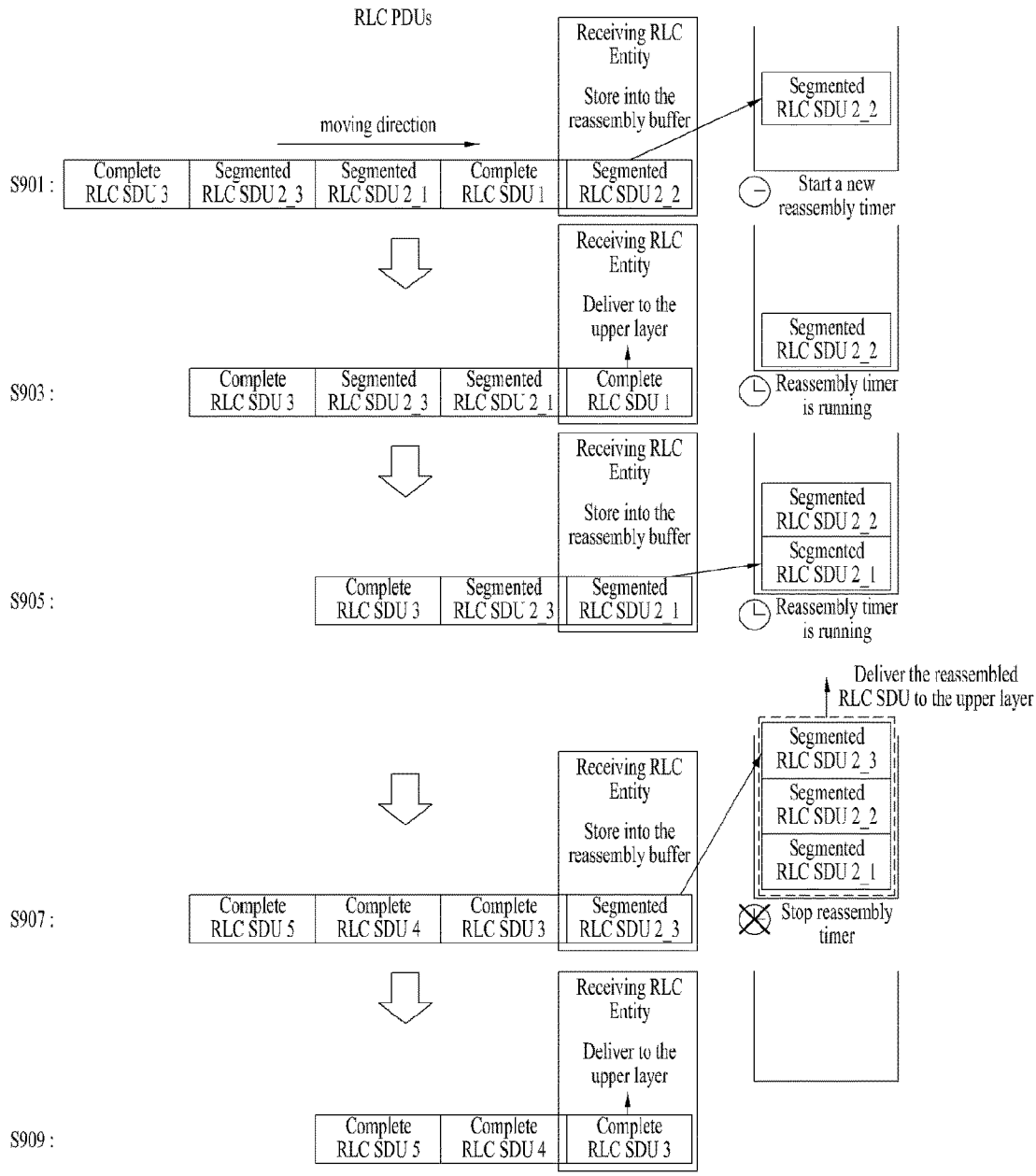
[Fig. 10]
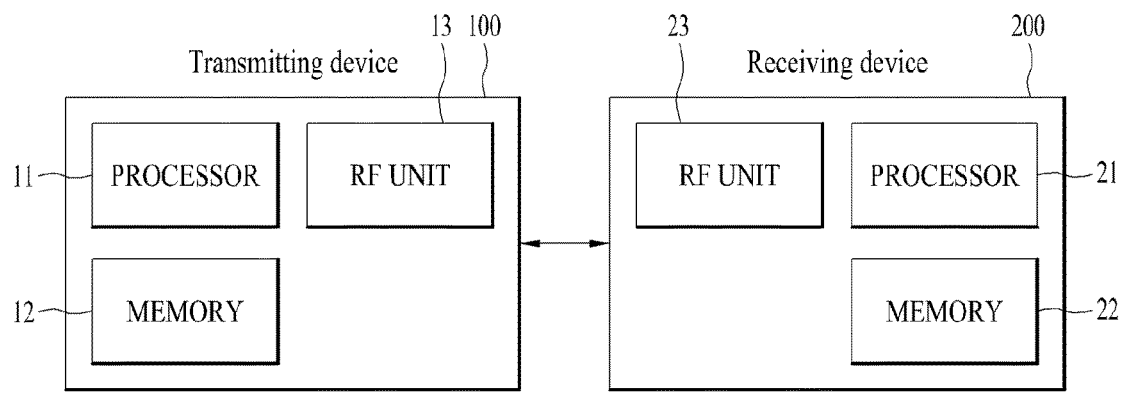

METHOD AND DEVICE FOR RECEIVING DATA UNIT

CROSS-REFERENCE TO RELATED APPLICATIONS

This application is a National Stage application under 35 U.S.C. § 371 of International Application No. PCT/KR2018/004790, filed on Apr. 25, 2018, which claims the benefit of U.S. Provisional Application No. 62/489,994, filed on Apr. 25, 2017. The disclosures of the prior applications are incorporated by reference in their entirety.

TECHNICAL FIELD

The present invention relates to a wireless communication system, and more particularly, to a method for receiving a data unit and an apparatus therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication. In addition, a communication system design considering a service/UE sensitive to reliability and latency is being discussed. The introduction of next-generation RAT, which takes into account such advanced mobile broadband communication, massive MTC (mMCT), and ultra-reliable and low latency communication (URLLC), is being discussed.

DISCLOSURE OF INVENTION

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, a method for transmitting/receiving signals effectively in a system supporting new radio access technology is required.

The technical objects that can be achieved through the present invention are not limited to what has been particularly described hereinabove and other technical objects not described herein will be more clearly understood by persons skilled in the art from the following detailed description.

Solution to Problem

In an aspect of the present invention, provided herein is a method for receiving a data unit by a receiving device in a wireless communication system. The method comprises: receiving, at a radio link control (RLC) entity of the receiving device, an RLC service data unit (SDU) segment of a first RLC SDU; and starting a first reassembly timer for the first RLC SDU if the RLC SDU segment of the first RLC SDU is the first one received for the first RLC SDU at the RLC entity. The receiving device uses a reassembly timer per RLC SDU segmented.

In another aspect of the present invention, provided herein is a receiving device for receiving a data unit in a wireless communication system. The receiving device comprises a transceiver unit, and a processor configured to control the transceiver. The processor is configured to: receive, at a radio link control (RLC) entity, an RLC service data unit (SDU) segment of a first RLC SDU; and start a first reassembly timer for the first RLC SDU if the RLC SDU segment of the first RLC SDU is the first one received for the first RLC SDU at the RLC entity. The receiving device uses a reassembly timer per RLC SDU segmented.

In each aspect of the present invention, the first reassembly timer may be started even if there is no missing RLC SDU segment of the first RLC SDU In each aspect of the present invention, if all RLC SDU segments of the first RLC SDU are received at the RLC entity while the first reassembly timer for the first RLC SDU is running, the receiving device may reassemble the RLC SDU segments of the first RLC SDU into the first RLC SDU. The RLC entity may deliver the first RLC SDU to an upper layer above the RLC entity, and stop the first reassembly timer for the first RLC SDU.

In each aspect of the present invention, the receiving device may receive, at the RLC entity, an RLC SDU segment of a second RLC SDU; and start a second reassembly timer for the second RLC SDU if the RLC SDU segment of the second RLC SDU is the first one received for the second RLC SDU at the RLC entity. The receiving device may start the second reassembly timer even while the first reassembly timer is running.

In each aspect of the present invention, the first and second reassembly timers may be running for the first and second RLC SDUs, respectively, at the RLC entity until the first and second reassembly timers expire or stop.

In each aspect of the present invention, a sequence number of the second RLC SDU may be different from a sequence number of the first RLC SDU. All RLC SDU segments of the first RLC SDU may be associated with the sequence number of the first RLC SDU, and all RLC SDU segments of the second RLC SDU may be associated with the sequence number of the second RLC SDU.

In each aspect of the present invention, the receiving device may discard the RLC SDU segment of the first RLC SDU if not all SDU segments of the first RLC SDU are received at the RLC entity when the first reassembly timer for the first RLC SDU expires.

The above technical solutions are merely some parts of the embodiments of the present invention and various embodiments into which the technical features of the present invention are incorporated can be derived and understood by persons skilled in the art from the following detailed description of the present invention.

Advantageous Effects of Invention

According to the present invention, radio communication signals can be efficiently transmitted/received. Therefore, overall throughput of a radio communication system can be improved.

According to an embodiment of the present invention, delay/latency occurring during communication between a user equipment and a BS may be reduced.

Also, signals in a new radio access technology system can be transmitted/received effectively.

It will be appreciated by persons skilled in the art that the effects that can be achieved through the present invention are not limited to what has been particularly described hereinabove and other advantages of the present invention will be more clearly understood from the following detailed description.

BRIEF DESCRIPTION OF DRAWINGS

The accompanying drawings, which are included to provide a further understanding of the invention, illustrate embodiments of the invention and together with the description serve to explain the principle of the invention.

FIG. 1 is a view schematically illustrating a network structure of an E-UMTS as an exemplary radio communication system.

FIG. 2 is a block diagram illustrating network structure of an evolved universal mobile telecommunication system (E-UMTS).

FIG. 3 is a block diagram depicting architecture of a typical E-UTRAN and a typical EPC.

FIG. 4 is a diagram showing a control plane and a user plane of a radio interface protocol between a UE and an E-UTRAN based on a 3GPP radio access network standard.

FIG. 5 is a view showing an example of a physical channel structure used in an E-UMTS system.

FIG. 6 illustrates a data flow example at a transmitting device in the LTE/LTE-A system.

FIG. 7 illustrates a data flow example at a transmitting device in the NR system.

FIG. 8 illustrates an example operation according to the present invention.

FIG. 9 illustrates another example operation according to the present invention.

FIG. 10 is a block diagram illustrating elements of a transmitting device 100 and a receiving device 200 for implementing the present invention.

MODE FOR THE INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP based wireless communication system. However, the technical features of the present invention are not limited thereto. For example, although the following detailed description is given based on a mobile communication system corresponding to a 3GPP based system, aspects of the present invention that are not limited to 3GPP based system are applicable to other mobile communication systems.

For example, the present invention is applicable to contention based communication such as Wi-Fi as well as non-contention based communication as in the 3GPP based system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, the term "assume" may mean that a subject to transmit a channel transmits the channel in accordance with the corresponding "assumption". This may also mean that a subject to receive the channel receives or decodes the channel in a form conforming to the "assumption", on the assumption that the channel has been transmitted according to the "assumption".

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Especially, a BS of the UMTS is referred to as a NB, a BS of the EPC/LTE is referred to as an eNB, and a BS of the new radio (NR) system is referred to as a gNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell.

Meanwhile, a 3GPP based system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the recent 3GPP based wireless communication standard uses the concept of a cell to manage radio resources. The "cell" associated with the radio resources is defined by combination of downlink resources and uplink resources, that is, combination of DL component carrier (CC) and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

In the present invention, "PDCCH" refers to a PDCCH, an EPDCCH (in subframes when configured), a MTC PDCCH (MPDCCH), for an RN with R-PDCCH configured and not suspended, to the R-PDCCH or, for NB-IoT to the narrowband PDCCH (NPDCCH).

In the present invention, monitoring a channel implies attempting to decode the channel. For example, monitoring a PDCCH implies attempting to decode PDCCH(s) (or PDCCH candidates).

In the present invention, for dual connectivity operation the term "special Cell" refers to the PCell of the master cell group (MCG) or the PSCell of the secondary cell group (SCG), otherwise the term Special Cell refers to the PCell. The MCG is a group of serving cells associated with a master eNB (MeNB) which terminates at least S1-MME, and the SCG is a group of serving cells associated with a secondary eNB (SeNB) that is providing additional radio resources for the UE but is not the MeNB. The SCG is comprised of a primary SCell (PSCell) and optionally one or more SCells. In dual connectivity, two MAC entities are configured in the UE: one for the MCG and one for the SCG. Each MAC entity is configured by RRC with a serving cell supporting PUCCH transmission and contention based Random Access. In this specification, the term SpCell refers to such cell, whereas the term SCell refers to other serving cells. The term SpCell either refers to the PCell of the MCG or the PSCell of the SCG depending on if the MAC entity is associated to the MCG or the SCG, respectively.

In the present invention, "C-RNTI" refers to a cell RNTI, "SI-RNTI" refers to a system information RNTI, "P-RNTI" refers to a paging RNTI, "RA-RNTI" refers to a random access RNTI, "SC-RNTI" refers to a single cell RNTI", "SL-RNTI" refers to a sidelink RNTI, and "SPS C-RNTI" refers to a semi-persistent scheduling C-RNTI.

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.300, 3GPP TS 36.321, 3GPP TS 36.322, 3GPP TS 36.323 and 3GPP TS 36.331, and 3GPP NR standard documents, for example, 3GPP TS 38.211, 3GPP TS 38.213, 3GPP TS 38.214, 3GPP TS 38.300, 3GPP TS 38.321, 3GPP TS 38.322, 3GPP TS 38.323 and 3GPP TS 38.331 may be referenced.

FIG. 2 is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNB 20 to UE 10, and "uplink" refers to communication from the UE to an eNB.

FIG. 3 is a block diagram depicting architecture of a typical E-UTRAN and a typical EPC.

As illustrated in FIG. 3, an eNB 20 provides end points of a user plane and a control plane to the UE 10. MME/SAE gateway 30 provides an end point of a session and mobility management function for UE 10. The eNB and MME/SAE gateway may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including NAS signaling to eNBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, roaming, authentication, bearer management functions including dedicated bearer establishment, support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

As illustrated, eNB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 4 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

In FIG. 4, Layer 1 (i.e. L1) of the 3GPP LTE/LTE-A system is corresponding to a physical layer. A physical (PHY) layer of a first layer (Layer 1 or L1) provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

FIG. 5 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. The PDCCH carries scheduling assignments and other control information. In FIG. 5, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information.

A time interval in which one subframe is transmitted is defined as a transmission time interval (TTI). Time resources may be distinguished by a radio frame number (or radio frame index), a subframe number (or subframe index), a slot number (or slot index), and the like. TTI refers to an interval during which data may be scheduled. For example, in the 3GPP LTE/LTE-A system, an opportunity of transmission of an UL grant or a DL grant is present every 1 ms, and the UL/DL grant opportunity does not exists several times in less than 1 ms. Therefore, the TTI in the legacy 3GPP LTE/LTE-A system is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information. In the present invention, a PDCCH addressed to a certain RNTI means that the PDCCH is CRC-masked with the certain RNTI. A UE may attempt to decode a PDCCH using the certain RNTI if the UE is monitoring a PDCCH addressed to the certain RNTI.

In FIG. 4, Layer 2 (i.e. L2) of the 3GPP LTE/LTE-A system is split into the following sublayers: Medium Access Control (MAC), Radio Link Control (RLC) and Packet Data Convergence Protocol (PDCP). The MAC layer of a second layer (Layer 2 or L2) provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4)

packet or an IP version 6 (IPv6) packet in a radio interface having a relatively small bandwidth.

The main services and functions of the MAC sublayer include: mapping between logical channels and transport channels; multiplexing/demultiplexing of MAC SDUs belonging to one or different logical channels into/from transport blocks (TB) delivered to/from the physical layer on transport channels; scheduling information reporting; error correction through HARQ; priority handling between logical channels of one UE; priority handling between UEs by means of dynamic scheduling; MBMS service identification; transport format selection; and padding.

The main services and functions of the RLC sublayer include: transfer of upper layer PDUs; error Correction through ARQ (only for AM data transfer); concatenation, segmentation and reassembly of RLC SDUs (only for UM and AM data transfer); re-segmentation of RLC data PDUs (only for AM data transfer); reordering of RLC data PDUs (only for UM and AM data transfer); duplicate detection (only for UM and AM data transfer); protocol error detection (only for AM data transfer); RLC SDU discard (only for UM and AM data transfer); and RLC re-establishment, except for a NB-IoT UE that only uses Control Plane CIoT EPS optimizations. Radio Bearers are not characterized by a fixed sized data unit (e.g. a fixed sized RLC PDU). In LTE, for reordering of RLC data PDUs, each of UM RLC entity and AM RLC entity maintains a reordering window, and various state variables as follows.

Each transmitting UM RLC entity shall maintain the following state variables:

a) VT(US): This state variable holds the value of the SN to be assigned for the next newly generated UMD PDU. It is initially set to 0, and is updated whenever the UM RLC entity delivers an UMD PDU with SN=VT(US).

Each receiving UM RLC entity shall maintain the following state variables:

a) VR(UR)—UM receive state variable: This state variable holds the value of the SN of the earliest UMD PDU that is still considered for reordering. It is initially set to 0. For RLC entity configured for sidelink traffic channel (STCH), it is initially set to the SN of the first received UMD PDU.

b) VR(UX)—UM t-Reordering state variable: This state variable holds the value of the SN following the SN of the UMD PDU which triggered t-Reordering.

c) VR(UH)—UM highest received state variable: This state variable holds the value of the SN following the SN of the UMD PDU with the highest SN among received UMD PDUs, and it serves as the higher edge of the reordering window. It is initially set to 0. For RLC entity configured for STCH, it is initially set to the SN of the first received UMD PDU.

The transmitting side of each AM RLC entity shall maintain the following state variables:

a) VT(A)—Acknowledgement state variable: This state variable holds the value of the SN of the next AMD PDU for which a positive acknowledgment is to be received in-sequence, and it serves as the lower edge of the transmitting window. It is initially set to 0, and is updated whenever the AM RLC entity receives a positive acknowledgment for an AMD PDU with SN=VT(A).

b) VT(MS)—Maximum send state variable: This state variable equals VT(A)+AM_Window_Size, and it serves as the higher edge of the transmitting window.

c) VT(S)—Send state variable: This state variable holds the value of the SN to be assigned for the next newly generated AMD PDU. It is initially set to 0, and is updated whenever the AM RLC entity delivers an AMD PDU with SN=VT(S).

The transmitting side of each AM RLC entity shall maintain the following counters:

a) RETX_COUNT—Counter: This counter counts the number of retransmissions of an AMD PDU. There is one RETX_COUNT counter per PDU that needs to be retransmitted.

The receiving side of each AM RLC entity shall maintain the following state variables:

a) VR(R)—Receive state variable: This state variable holds the value of the SN following the last in-sequence completely received AMD PDU, and it serves as the lower edge of the receiving window. It is initially set to 0, and is updated whenever the AM RLC entity receives an AMD PDU with SN=VR(R).

b) VR(MR)—Maximum acceptable receive state variable: This state variable equals VR(R)+AM_Window_Size, and it holds the value of the SN of the first AMD PDU that is beyond the receiving window and serves as the higher edge of the receiving window.

c) VR(X)—t-Reordering state variable: This state variable holds the value of the SN following the SN of the RLC data PDU which triggered t-Reordering.

d) VR(MS)—Maximum STATUS transmit state variable: This state variable holds the highest possible value of the SN which can be indicated by "ACK_SN" when a STATUS PDU needs to be constructed. It is initially set to 0.

e) VR(H)—Highest received state variable: This state variable holds the value of the SN following the SN of the RLC data PDU with the highest SN among received RLC data PDUs. It is initially set to 0.

A constant UM_Window_Size is used by the receiving UM RLC entity to define SNs of those UMD PDUs that can be received without causing an advancement of the receiving window. UM_Window_Size=16 when a 5 bit SN is configured, UM_Window_Size=512 when a 10 bit SN is configured and UM_Window_Size=0 when the receiving UM RLC entity is configured for MCCH, MTCH, SC-MCCH, SC-MTCH or STCH. A constant AM_Window_Size is used by both the transmitting side and the receiving side of each AM RLC entity to calculate VT(MS) from VT(A), and VR(MR) from VR(R). AM_Window_Size=512 when a 10 bit SN is used, AM_Window_Size=32768 when a 16 bit SN is used.

The timer t-Reordering is used by the receiving side of an AM RLC entity and receiving UM RLC entity in order to detect loss of RLC PDUs at lower layer. If t-Reordering is running, t-Reordering shall not be started additionally, i.e. only one t-Reordering per RLC entity is running at a given time. The duration of the timer t-Reordering is configured to the UE via the IE RLC-Config used to specify the RLC configuration of SRBs and DRBs (see 3GPP TS 36.331).

In the above description, all state variables and all counters are non-negative integers. All state variables related to AM data transfer can take values from 0 to 1023 for 10 bit SN or from 0 to 65535 for 16 bit SN. All arithmetic operations contained in the present document on state variables related to AM data transfer are affected by the AM modulus (i.e. final value=[value from arithmetic operation] modulo 1024 for 10 bit SN and 65536 for 16 bit SN). All state variables related to UM data transfer can take values from 0 to $[2^{[sn\text{-}FieldLength]}-1]$. All arithmetic operations contained in the present document on state variables related to UM data transfer are affected by the UM modulus (i.e. final value=[value from arithmetic operation] modulo $2^{[sn-FieldLength]}$). AMD PDUs and UMD PDUs are numbered integer sequence numbers (SN) cycling through the field: 0 to 1023 for 10 bit SN and 0 to 65535 for 16 bit SN for AMD PDU and 0 to $[2^{[sn-FieldLength]}-1]$ for UMD PDU. When performing arithmetic comparisons of state variables or SN values, a modulus base shall be used. VT(A) and VR(R) shall be assumed as the modulus base at the transmitting side and receiving side of an AM RLC entity, respectively. This modulus base is subtracted from all the values involved, and then an absolute comparison is performed (e.g. VR(R) <=SN<VR(MR) is evaluated as [VR(R)−VR(R)] modulo 1024<=[SN−VR(R)] modulo 1024<[VR(MR)−VR(R)] modulo 1024). VR(UH)−UM_Window_Size shall be assumed as the modulus base at the receiving side of an UM RLC entity. This modulus base is subtracted from all the values involved, and then an absolute comparison is performed (e.g. (VR(UH)−UM_Window_Size)<=SN<VR(UH) is evaluated as [(VR(UH)−UM_Window_Size)−(VR(UH)− UM_Window_Size)] modulo $2^{[sn-Feild-Length]}$<=[SN−(VR (UH)−UM_Window_Size)] modulo $2^{[sn-FieldLength]}$<[VR (UH)−(VR(UH)−UM_Window_Size)] modulo $2^{[sn-FieldLength]}$). For the further detailed reordering function at the RLC layer of LTE, 3GPP TS 36.323 may be referenced.

The ARQ within the RLC sublayer has the following characteristics: ARQ retransmits RLC PDUs or RLC PDU segments based on RLC status reports; polling for RLC status report is used when needed by RLC; RLC receiver can also trigger RLC status report after detecting a missing RLC PDU or RLC PDU segment. When retransmitting a portion of an AMD PDU, the transmitting side of an AM RLC entity shall segment the portion of the AMD PDU as necessary, form a new AMD PDU segment which will fit within the total size of RLC PDU(s) indicated by lower layer at the particular transmission opportunity and deliver the new AMD PDU segment to lower layer. When forming a new AMD PDU segment, the transmitting side of an AM RLC entity shall: only map the Data field of the original AMD PDU to the Data field of the new AMD PDU segment; set the header of the new AMD PDU segment; and set the P field. In the LTE/LTE-A system, segmentation can occur for retransmission but does not occur for new transmission (i.e. initial transmission).

In FIG. 4, the main services and functions of the PDCP sublayer for the user plane include: header compression and decompression: ROHC only; transfer of user data; in-sequence delivery of upper layer PDUs at PDCP re-establishment procedure for RLC AM; for split bearers in DC and LWA bearers (only support for RLC AM): PDCP PDU routing for transmission and PDCP PDU reordering for reception; duplicate detection of lower layer SDUs at PDCP re-establishment procedure for RLC AM; retransmission of PDCP SDUs at handover and, for split bearers in DC and LWA bearers, of PDCP PDUs at PDCP data-recovery procedure, for RLC AM; ciphering and deciphering; timer-based SDU discard in uplink. The main services and functions of the PDCP for the control plane include: ciphering and integrity protection; and transfer of control plane data. For split and LWA bearers, PDCP supports routing and reordering. For DRBs mapped on RLC AM and for LWA bearers, the PDCP entity uses the reordering function when the PDCP entity is associated with two AM RLC entities, when the PDCP entity is configured for a LWA bearer; or when the PDCP entity is associated with one AM RLC entity after it was, according to the most recent reconfiguration, associated with two AM RLC entities or configured for a LWA bearer without performing PDCP re-establishment. In LTE, for reordering of PDCP PDUs, each PDCP entity maintains a reordering window, the maximum value of PDCP SN and various state variables as follows.

The transmitting side of each PDCP entity shall maintain the following state variables:

a) Next_PDCP_TX_SN: The variable Next_PDCP_TX_SN indicates the PDCP SN of the next PDCP SDU for a given PDCP entity. At establishment of the PDCP entity, the UE shall set Next_PDCP_TX_SN to 0.

b) TX_HFN: The variable TX_HFN indicates the HFN value for the generation of the COUNT value used for PDCP PDUs for a given PDCP entity. At establishment of the PDCP entity, the UE shall set TX_HFN to 0.

The receiving side of each PDCP entity shall maintain the following state variables:

c) Next_PDCP_RX_SN: The variable Next_PDCP_RX_SN indicates the next expected PDCP SN by the receiver for a given PDCP entity. At establishment of the PDCP entity, the UE shall set Next_PDCP_RX_SN to 0.

d) RX_HFN: The variable RX_HFN indicates the HFN value for the generation of the COUNT value used for the received PDCP PDUs for a given PDCP entity. At establishment of the PDCP entity, the UE shall set RX_HFN to 0.

e) Last_Submitted_PDCP_RX_SN: For PDCP entities for DRBs mapped on RLC AM the variable Last_Submitted_PDCP_RX_SN indicates the SN of the last PDCP SDU delivered to the upper layers. At establishment of the PDCP entity, the UE shall set Last_Submitted_PDCP_RX_SN to Maximum_PDCP_SN.

f) Reordering_PDCP_RX_COUNT: This variable is used only when the reordering function is used. This variable holds the value of the COUNT following the COUNT value associated with the PDCP PDU which triggered t-Reordering.

The constant Reordering_Window indicates the size of the reordering window. The size equals to 2048 when a 12 bit SN length is used, 16384 when a 15 bit SN length is used, or 131072 when 18 bit SN length is used, i.e. half of the PDCP SN space, for radio bearers that are mapped on RLC AM. The constant Maximum_PDCP_SN is 262143 if the PDCP entity is configured for the use of 18 bits SNs, 65535 if the PDCP entity is configured for the use of 16 bits SNs, 32767 if the PDCP entity is configured for the use of 15 bits SNs, 4095 if the PDCP entity is configured for the use of 12 bit SNs, 127 if the PDCP entity is configured for the use of 7 bit SNs, and 31 if the PDCP entity is configured for the use of 5 bit SNs. The timer t-Reordering is used to detect loss of PDCP PDUs. If t-Reordering is running, t-Reordering shall not be started additionally, i.e. only one t-Reordering per PDCP entity is running at a given time. The duration of the timer t-Reordering is configured to the UE via the IE PDCP-Config used to specify the PDCP configuration of SRBs and DRBs (see 3GPP TS 36.331). For the further detailed reordering function at the PDCP layer of LTE, 3GPP TS 36.323 may be referenced.

In FIG. 4, Layer 3 (i.e. L3) of the LTE/LTE-A system includes the following sublayers: Radio Resource Control (RRC) and Non Access Stratum (NAS). A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other. The non-access stratum (NAS) layer positioned over the RRC layer performs functions such as session management and mobility management.

Radio bearers are roughly classified into (user) data radio bearers (DRBs) and signaling radio bearers (SRBs). SRBs are defined as radio bearers (RBs) that are used only for the transmission of RRC and NAS messages.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

FIG. 6 illustrates a data flow example at a transmitting device in the LTE/LTE-A system. Especially, FIG. 6 shows an uplink (UL) data flow example where a UE is a transmitting side and a BS or network is a receiving side. A downlink (DL) data flow is similar to the UL data flow, except that a UE should receive a UL grant used for UL MAC PDU transmission while a BS does not have to receive a DL grant used for DL MAC PDU transmission but can allocate it for itself.

Referring to FIG. 6, in LTE, a MAC PDU construction process at a UE starts when a UL grant is received, as follows.

1. The UE receives a UL grant from an eNB.
2. The MAC entity performs Logical Channel Prioritization (LCP) procedure to determine the RLC PDU size for each RLC entity.
3. The MAC entity indicates the determined RLC PDU size to each RLC entity.
4. Each RLC entity performs segmentation and/or concatenation of RLC SDUs to construct a RLC PDU. For each RLC PDU, Framing Info (FI) and RLC Sequence Number (RSN) are mandatorily present. The Length Indicator (LI) is included each time two RLC SDUs (segments) are concatenated.
5. Each RLC entity delivers the constructed RLC PDU to the MAC entity.
6. The MAC entity concatenates RLC PDUs received from multiple RLC entities.
7. The MAC entity sets the value of MAC subheader for each MAC SDU, and collects all MAC subheaders in front of the MAC PDU to form a MAC header.

A fully mobile and connected society is expected in the near future, which will be characterized by a tremendous amount of growth in connectivity, traffic volume and a much broader range of usage scenarios. Some typical trends include explosive growth of data traffic, great increase of connected devices and continuous emergence of new services. Besides the market requirements, the mobile communication society itself also requires a sustainable development of the eco-system, which produces the needs to further improve system efficiencies, such as spectrum efficiency, energy efficiency, operational efficiency and cost efficiency. To meet the above ever-increasing requirements from market and mobile communication society, next generation access technologies are expected to emerge in the near future.

Building upon its success of IMT-2000 (3G) and IMT-Advanced (4G), 3GPP has been devoting its effort to IMT-2020 (5G) development since September 2015. 5G New Radio (NR) is expected to expand and support diverse use case scenarios and applications that will continue beyond the current IMT-Advanced standard, for instance, enhanced Mobile Broadband (eMBB), Ultra Reliable Low Latency Communication (URLLC) and massive Machine Type Communication (mMTC). eMBB is targeting high data rate mobile broadband services, such as seamless data access both indoors and outdoors, and AR/VR applications; URLLC is defined for applications that have stringent latency and reliability requirements, such as vehicular communications that can enable autonomous driving and control network in industrial plants; mMTC is the basis for connectivity in IoT, which allows for infrastructure management, environmental monitoring, and healthcare applications.

The overall protocol stack architecture for the NR system might be similar to that of the LTE/LTE-A system, but some functionalities of the protocol stacks of the LTE/LTE-A system should be modified in the NR system in order to resolve the weakness or drawback of LTE. RAN WG2 for NR is in charge of the radio interface architecture and protocols. The new functionalities of the control plane include the following: on-demand system information delivery to reduce energy consumption and mitigate interference, two-level (i.e. Radio Resource Control (RRC) and Medium Access Control (MAC)) mobility to implement seamless handover, beam based mobility management to accommodate high frequency, RRC inactive state to reduce state transition latency and improve UE battery life. The new functionalities of the user plane aim at latency reduction by optimizing existing functionalities, such as concatenation and reordering relocation, and RLC out of order delivery. In addition, a new user plane AS protocol layer named as Service Data Adaptation Protocol (SDAP) has been introduced to handle flow-based Quality of Service (QoS) framework in RAN, such as mapping between QoS flow and a data radio bearer, and QoS flow ID marking. Hereinafter the layer 2 according to the current agreements for NR is briefly discussed.

The layer 2 of NR is split into the following sublayers: Medium Access Control (MAC), Radio Link Control (RLC), Packet Data Convergence Protocol (PDCP) and Service Data Adaptation Protocol (SDAP). The physical layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers, and the SDAP sublayer offers to 5GC QoS flows. Radio bearers are categorized into two groups: data radio bearers (DRB) for user plane data and signaling radio bearers (SRB) for control plane data.

The main services and functions of the MAC sublayer of NR include: mapping between logical channels and transport channels; multiplexing/demultiplexing of MAC SDUs belonging to one or different logical channels into/from transport blocks (TB) delivered to/from the physical layer on transport channels; scheduling information reporting; error correction through HARQ (one HARQ entity per carrier in case of carrier aggregation); priority handling between UEs by means of dynamic scheduling; priority handling between logical channels of one UE by means of logical channel prioritization; and padding. A single MAC entity can support one or multiple numerologies and/or transmission timings and mapping restrictions in logical channel prioritisation controls which numerology and/or transmission timing a logical channel can use.

The RLC sublayer of NR supports three transmission modes: Transparent Mode (TM); Unacknowledged Mode (UM); Acknowledged Mode (AM). The RLC configuration is per logical channel with no dependency on numerologies and/or TTI durations, and ARQ can operate on any of the numerologies and/or TTI durations the logical channel is configured with. For SRB0, paging and broadcast system information, TM mode is used. For other SRBs AM mode used. For DRBs, either UM or AM mode are used. The main services and functions of the RLC sublayer depend on the transmission mode and include: transfer of upper layer PDUs; Sequence numbering independent of the one in PDCP (UM and AM); error correction through ARQ (AM only); segmentation (AM and UM) and re-segmentation (AM only) of RLC SDUs; Reassembly of SDU (AM and UM); duplicate detection (AM only); RLC SDU discard (AM and UM); RLC re-establishment; and protocol error detection (AM only). The ARQ within the RLC sublayer of NR has the following characteristics: ARQ retransmits RLC PDUs or RLC PDU segments based on RLC status reports; polling for RLC status report is used when needed by RLC; and RLC receiver can also trigger RLC status report after detecting a missing RLC PDU or RLC PDU segment.

The main services and functions of the PDCP sublayer of NR for the user plane include: sequence numbering; header compression and decompression: ROHC only; transfer of user data; reordering and duplicate detection; PDCP PDU routing (in case of split bearers); retransmission of PDCP SDUs; ciphering, deciphering and integrity protection; PDCP SDU discard; PDCP re-establishment and data recovery for RLC AM; and duplication of PDCP PDUs. The main services and functions of the PDCP sublayer of NR for the control plane include: sequence numbering; ciphering, deciphering and integrity protection; transfer of control plane data; reordering and duplicate detection; and duplication of PDCP PDUs.

The main services and functions of SDAP include: mapping between a QoS flow and a data radio bearer; marking QoS flow ID (QFI) in both DL and UL packets. A single protocol entity of SDAP is configured for each individual PDU session. Compared to LTE's QoS framework, which is bearer-based, the 5G system adopts the QoS flow-based framework. The QoS flow-based framework enables flexible mapping of QoS flow to DRB by decoupling QoS flow and the radio bearer, allowing more flexible QoS characteristic configuration.

FIG. 7 illustrates a data flow example at a transmitting device in the NR system.

In FIG. 7, an RB denotes a radio bearer. Referring to FIG. 7, a transport block is generated by MAC by concatenating two RLC PDUs from $RB_x$ and one RLC PDU from $RB_y$. The two RLC PDUs from $RB_x$ each corresponds to one IP packet (n and n+1) while the RLC PDU from $RB_y$ is a segment of an IP packet (m).

In NR, it has been agreed that the concatenation function and the reordering function for in-order delivery service will move into the MAC layer and the PDCP layer respectively.

In NR, in-sequence delivery is supported by PDCP, i.e. RLC does not support the in-sequence delivery of SDU to PDCP. However, segmentation and reassembly of a RLC SDU will remain in the RLC layer. For this, the RLC reassembling mechanism for RLC SDU segments which are segmented from one complete RLC SDU should be studied.

The RLC entity in LTE uses the window based mechanism which is based on sequence number (SN), e.g., reordering window, to detect a missing RLC PDU and to reassemble RLC SDU segments. The RLC entity in LTE has to maintain various state variables because of the reordering window. However, this reordering window will not be available anymore at the RLC layer in NR because the concatenation function and the reordering function for in-order delivery service will move into the MAC layer and the PDCP layer respectively. And the SN based window mechanism is insufficient to reassemble RLC SDU segments perfectly because all segments from one complete RLC SDU should have the same SN. Therefore, a new method to reassemble RLC SDU segments should be defined in the RLC layer. To resolve the problem, the present invention proposes the timer based method to reassemble RLC SDU segments properly.

The present invention proposes that the receiving RLC entity maintain a reassembly timer for each RLC SDU which is segmented to reassemble the RLC SDU from RLC SDU segments. The timer value may be configured by gNB via RRC signaling. The timer value may be configured when the RLC entity is established.

A receiving UM RLC entity may need to handle several segmented RLC SDUs for reassembly simultaneously. This is because the receiving RLC entity could receive another segmented RLC SDU while managing one segmented RLC SDU. Therefore, in the present invention, a receiving RLC entity may maintain multiple reassembly timers, one for each RLC SDU which is segmented. In other words, a receiving RLC entity of the present invention uses a reassembly timer per RLC SDU segmented.

In the present invention, each RLC PDU can contain a complete RLC SDU or a RLC SDU segment. Each RLC PDU may have two bits indicator to indicate whether the RLC PDU contains a complete RLC SDU, the first RLC SDU segment, the middle RLC SDU segment or the last RLC SDU segment. Each RLC PDU, which contains RLC SDU segment, can have segment offset field to indicate the position of the RLC SDU segment within the original RLC SDU. In the present invention, all RLC SDU segments from one complete RLC SDU have the same SN.

In the present invention, the receiving RLC entity can be AM or UM RLC entity. The receiving RLC entity can be located in UE, eNB, gNB, or other wireless network/devices.

A timer operation, generally, consists of start condition, stop condition, and expiry behavior. In the present invention, if the receiving RLC entity receives a RLC SDU segment from the MAC layer and if the RLC SDU segment is the first received segment belonging to the RLC SDU, the receiving RLC entity stores the RLC SDU segment in the reassembly buffer and starts a reassembly timer for the RLC SDU to which the received RLC SDU segment belongs. The reassembly timer is running once it started, until it is stopped or until it expires. The reassembly timer can be started if it is not running. The reassembly timer is not restarted if the receiving RLC entity receives another RLC SDU segment belonging to the same RLC SDU as that of an RLC SDU segment having the reassembly timer started.

In LTE, the reordering timer t-Reordering at RLC is started when the receiving RLC entity detects that there is a missing RLC PDU or a missing RLC PDU segment, and the reordering timer t-Reordering at PDCP is started when the receiving PDCP entity detects that there is a missing PDCP PDU. If a reassembly timer can be started only when the receiving RLC entity detects that there is a missing RLC SDU or RLC SDU segment, the receiving RLC entity needs at least two received RLC PDUs to determine whether a missing RLC SDU or a missing RLC SDU segment exists or not. Besides, when the last RLC SDU segment is missed at the end of data transmission, i.e., no more RLC PDU is expected to be received, if there is no reassembly window to detect a missing RLC SDU segment, the receiving RLC entity could not detect that the last RLC SDU segment is missing, because there is no more RLC SDU or RLC SDU segment. In this case, the receiving RLC entity could not start a reassembly timer and would wait for the missing RLC SDU segment forever. Consequently, the corresponding segmented RLC SDU would not be reassembled because the receiving RLC entity could not start a reassembly timer. In the present invention, a reassembly timer can be started for an RLC SDU even if there is no missing RLC SDU segment of the RLC SDU. Therefore, the present invention does not need a detecting method for a missing RLC SDU segment, and does not need a reassembly window. The receiving RLC entity of the present invention does not have to maintain various state variables because a reassembly window is not used to reassembly an RLC SDU in the present invention.

t-Reordering at an RLC entity of LTE is not be started additionally if t-Reordering at the RLC entity of LTE is running, i.e., only one t-Reordering per RLC entity is running at a given time, and t-Reordering at a PDCP entity of LTE is not be started additionally if t-Reordering at the PDCP entity of LTE is running, i.e., only one t-Reordering per PDCP entity is running at a given time. In the present invention, even if a reassembly timer for an RLC SDU is running, another reassembly timer can be started for another RLC SDU. Accordingly, in the present invention, multiple reassembly timers can be running per RLC entity at a given time. Each of multiple reassembly timers can be running at an RLC entity until it expires or until it is stopped.

While the reassembly timer is running, if all segments of the RLC SDU are received, the receiving RLC entity reassembles the RLC SDU from RLC SDU segments, and delivers it to upper layer and stops the reassembly timer. When the reassembly timer expires, if not all segments of the RLC SDU are received, the receiving RLC entity discards RLC SDU segments belonging to the RLC SDU, and resets the reassembly timer.

Basically when the receiving RLC entity receives a RLC PDU, the receiving RLC entity firstly checks two bits indicator to determine whether the RLC PDU contains a complete RLC SDU, the first RLC SDU segment, the middle RLC segment or the last RLC SDU segment. When the receiving RLC entity receives a RLC PDU which contains a RLC SDU segment, the receiving RLC entity looks at the segment offset field to find the position of the RLC SDU segment within the original RLC SDU.

FIG. 8 illustrates an example operation according to the present invention.

In the example of FIG. 8, the first MAC PDU delivers two RLC PDUs, which contain the complete RLC SDU 1 and segment RLC SDU 2_1. The second MAC PDU delivers one RLC PDU, which contains the segment RLC SDU 2_2. The third MAC PDU delivers two RLC PDUs, which contain the segment RLC SDU 2_3 and the complete RLC SDU 3. The fourth MAC PDU delivers two RLC PDUs, which contain the complete RLC SDU 4 and the complete RLC SDU 5.

When the receiving RLC entity received the complete RLC SDU 1, the receiving RLC entity delivers it to the upper layer (S801).

After that, when the receiving RLC entity received the first segment belonging to the RLC SDU 2 (RLC SDU 2_1), the receiving RLC entity stores this segment into the reassembly buffer and starts a new reassembly timer (S803).

When the receiving RLC entity received the second segment belonging to the RLC SDU 2 (RLC SDU 2_2), the receiving RLC entity stores this segment into the reassembly buffer (S805).

When the receiving RLC entity received the third segment belonging to the RLC SDU 2 (RLC SDU 2_3), the receiving RLC entity stores this segment into the reassembly buffer and then reassembles the RLC SDU 2 from RLC SDU segments (RLC SDU 2_1, RLC SDU 2_2 and RLC SDU 2_3) and delivers it to upper layer and stops the reassembly timer (S807).

When the receiving RLC entity received the complete RLC SDU 3, the receiving RLC entity delivers it to the upper layer (S809).

FIG. 9 illustrates another example operation according to the present invention.

In the example of FIG. 9, the first MAC PDU delivers one RLC PDU, which contains the segment RLC SDU 2_2. The second MAC PDU delivers two RLC PDUs, which contain the complete RLC SDU 1 and the segment RLC SDU 2_1. This is the case when the first MAC PDU and the second MAC PDU are received out-of-order due to use of multiple HARQ processes. The third MAC PDU delivers two RLC PDUs, which contain the segment RLC SDU 2_3 and the complete RLC SDU 3. The fourth MAC PDU delivers two RLC PDUs, which contain the complete RLC SDU 4 and the complete RLC SDU 5.

When the receiving RLC entity received the second segment (RLC SDU 2_2) belonging to the RLC SDU 2, even though the received RLC SDU segment is not the first RLC SDU segment (RLC SDU 2_1), the receiving RLC entity stores this segment into the reassembly buffer and starts a new reassembly timer (S901). In other words, in the present invention, a reassembly timer for an RLC SDU is started if an RLC SDU segment received at the receiving RLC entity is the first one received for the RLC SDU.

When the receiving RLC entity received the complete RLC SDU 1, the receiving RLC entity delivers it to the upper layer (S903).

When the receiving RLC entity received the first segment (RLC SDU 2_1) belonging to the RLC SDU 2, the receiving RLC entity stores this segment into the reassembly buffer (S905). When receiving the first segment (RLC SDU 2_1), the receiving RLC entity keeps the reassembly timer running for the RLC SDU 2 and does not restart the reassembly timer for the RLC SDU 2 because the first segment (RLC SDU 2_1) is not the first one received for the RLC SDU 2.

When the receiving RLC entity received the third segment belonging to the RLC SDU 2 (RLC SDU 2_3), the receiving RLC entity stores this segment into the reassembly buffer and then reassembles the RLC SDU 2 from RLC SDU segments (RLC SDU 2_1, RLC SDU 2_2 and RLC SDU 2_3) and delivers it to upper layer and stops the reassembly timer (S907).

When the receiving RLC entity received the complete RLC SDU 3, the receiving RLC entity delivers it to the upper layer (S909).

FIG. 10 is a block diagram illustrating elements of a transmitting device 100 and a receiving device 200 for implementing the present invention.

The transmitting device 100 and the receiving device 200 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 100 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 200 is the reverse of the signal processing process of the transmitting device 100. Under control of the processor 21, the RF unit 23 of the receiving device 200 receives radio signals transmitted by the transmitting device 100. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 100 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 200. An RS transmitted through a corresponding antenna defines an antenna from the view point of the receiving device 200 and enables the receiving device 200 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas. The RF units 13 and 23 may be referred to as transceivers.

In the embodiments of the present invention, a UE operates as the transmitting device 100 in UL and as the receiving device 200 in DL. In the embodiments of the present invention, a gNB operates as the receiving device 200 in UL and as the transmitting device 100 in DL. Hereinafter, a processor, a transceiver, and a memory included in the UE will be referred to as a UE processor, a UE transceiver, and a UE memory, respectively, and a processor, a transceiver, and a memory included in the gNB will be referred to as a gNB processor, a gNB transceiver, and a gNB memory, respectively.

The UE processor can be configured to operate according to the present invention, or control the UE transceiver to receive or transmit signals according to the present invention. The gNB processor can be configured to operate according to the present invention, or control the gNB transceiver to receive or transmit signals according to the present invention.

In the present invention, a transceiver 23 of a receiving device 200 receives radio signals carrying MAC PDU(s). A processor 21 of the receiving device 200 processes the MAC PDU(s) to produce RLC SDU(s) and/or RLC SDU segment(s) at a MAC layer, and delivers the RLC SDU(s) and/or RLC SDU segment(s) to an RLC entity. In the present invention, if the RLC entity receive an RLC SDU segment of a first RLC SDU and if the RLC SDU segment of the first RLC SDU is the first one received for the first RLC SDU at the RLC entity, the processor 21 starts a first reassembly timer for the first RLC SDU.

In the present invention, the processor 21 may be configured to use a reassembly timer per RLC SDU segmented. The processor 21 is configured to start the first reassembly timer even if there is no missing RLC SDU segment of the first RLC SDU. If all RLC SDU segments of the first RLC SDU are received at the RLC entity while the first reassembly timer for the first RLC SDU is running, the processor 21 is configured to reassemble the RLC SDU segments of the first RLC SDU into the first RLC SDU, deliver the first RLC SDU to an upper layer above the RLC entity, and stop the first reassembly timer for the first RLC SDU. If the RLC entity receives an RLC SDU segment of a second RLC SDU and if the RLC SDU segment of the second RLC SDU is the first one received for the second RLC SDU at the RLC entity, the processor 21 is configured to start a second reassembly timer for the second RLC SDU. The processor 21 is configured to start the second reassembly timer even while the first reassembly timer is running. The processor 21 is configured to running the first and second reassembly timers for the first and second RLC SDUs, respectively, at the RLC entity until the first and second reassembly timers expire or stop. A sequence number of the second RLC SDU is different from a sequence number of the first RLC SDU. All RLC SDU segments of the first RLC SDU are associated with the sequence number of the first RLC SDU, and All RLC SDU segments of the second RLC SDU are associated with the sequence number of the second RLC SDU. The processor 21 is configured to discard the RLC SDU segment of the first RLC SDU if not all SDU segments of the first RLC SDU are received at the RLC entity when the first reassembly timer for the first RLC SDU expires.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a network node (e.g., BS), a UE, or other devices in a wireless communication system.

The invention claimed is:

1. A method for receiving a data unit by a receiving device in a wireless communication system, the method comprising:
   starting, at a radio link control (RLC) entity of the receiving device, a reassembly timer based on an RLC service data unit (SDU) segment of a first RLC SDU;
   based on receiving, at the RLC entity, all RLC SDU segments of the first RLC SDU:
     reassembling the RLC SDU segments of the first RLC SDU into the first RLC SDU;
     delivering the first RLC SDU to an upper layer above the RLC entity; and
     stopping the reassembly timer; and
   based on (i) expiry of the reassembly timer and (ii) receiving, at the RLC entity, not all the RLC SDU segments of the first RLC SDU:
     discarding all received RLC SDU segments of the first RLC SDU.

2. The method according to claim 1,
   wherein the reassembly timer is started even if there is no missing RLC SDU segment of the first RLC SDU.

3. The method according to claim 1, further comprising:
   starting, at the RLC entity, another reassembly timer based on an RLC SDU segment of a second RLC SDU,
   wherein the another reassembly timer is started even while the reassembly timer, which was started based on the RLC SDU segment of the first RLC SDU, is running.

4. The method according to claim 3,
   wherein the reassembly timers are running for the first and second RLC SDUs, respectively, at the RLC entity until the reassembly timers expire or stop.

5. The method according to claim 3,
   wherein a sequence number of the second RLC SDU is different from a sequence number of the first RLC SDU, and
   wherein all RLC SDU segments of the first RLC SDU are associated with the sequence number of the first RLC SDU, and all RLC SDU segments of the second RLC SDU are associated with the sequence number of the second RLC SDU.

6. A receiving device for receiving a data unit in a wireless communication system, the receiving device comprising:
   a transceiver;
   a processor; and
   a memory storing at least one program that causes the processor to perform operations comprising:
   starting, at a radio link control (RLC) entity, a reassembly timer based on an RLC service data unit (SDU) segment of a first RLC SDU;
   based on receiving, at the RLC entity, all RLC SDU segments of the first RLC SDU:
     reassembling the RLC SDU segments of the first RLC SDU into the first RLC SDU;
     delivering the first RLC SDU to an upper layer above the RLC entity; and
     stopping the reassembly timer; and
   based on (i) expiry of the reassembly timer and (ii) receiving, at the RLC entity, not all the RLC SDU segments of the first RLC SDU:
     discarding all received RLC SDU segments of the first RLC SDU.

7. The receiving device according to claim 6,
   wherein the reassembly timer is started even if there is no missing RLC SDU segment of the first RLC SDU.

8. The receiving device according to claim 6, wherein the operations comprise:
   starting, at the RLC entity, another reassembly timer based on an RLC SDU segment of second RLC SDU,
   wherein the another reassembly timer is started even while the reassembly timer, which was started based on the RLC SDU segment of the first RLC SDU, is running.

9. The receiving device according to claim 8,
   wherein the reassembly timers are running for the first and second RLC SDUs, respectively, at the RLC entity until the reassembly timers expire or stop.

10. The receiving device according to claim 8,
    wherein a sequence number of the second RLC SDU is different from a sequence number of the first RLC SDU, and
    wherein all RLC SDU segments of the first RLC SDU are associated with the sequence number of the first RLC SDU, and all RLC SDU segments of the second RLC SDU are associated with the sequence number of the second RLC SDU.

* * * * *